Figure 1:
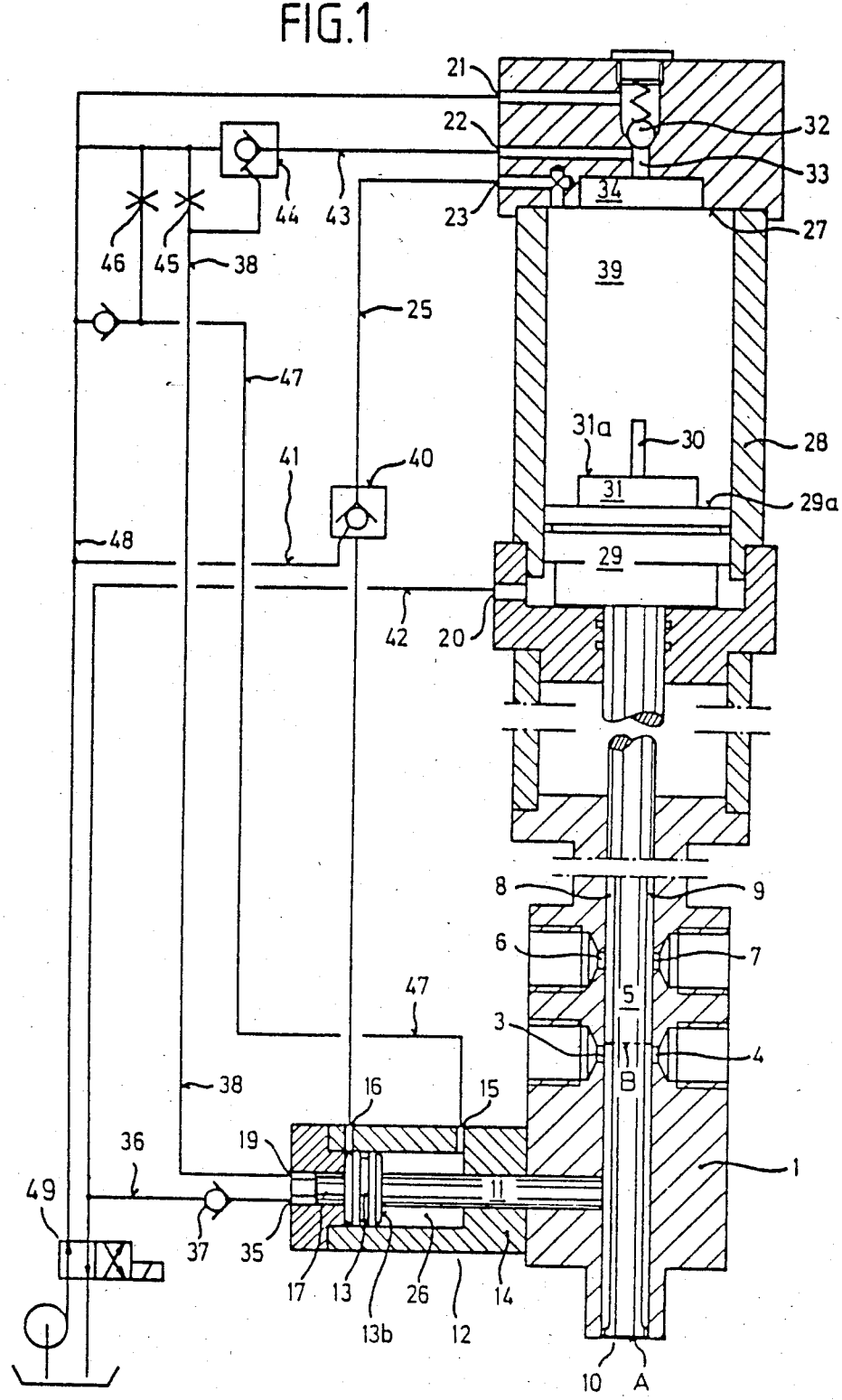

United States Patent [19]

Taubenmann

[11] Patent Number: 4,592,657
[45] Date of Patent: Jun. 3, 1986

[54] MIXING HEAD FOR PRODUCING A PREFERABLY CHEMICALLY REACTIVE MIXTURE OF TWO OR MORE PLASTICS COMPONENTS

[75] Inventor: Peter Taubenmann, Munich, Fed. Rep. of Germany

[73] Assignee: Elastogran Maschinenbau GmbH, Strasslach, Fed. Rep. of Germany

[21] Appl. No.: 645,755

[22] Filed: Aug. 30, 1984

[30] Foreign Application Priority Data

Sep. 2, 1983 [DE] Fed. Rep. of Germany ....... 3331731

[51] Int. Cl.$^4$ .............................................. B01F 5/04
[52] U.S. Cl. .................................. 366/134; 366/177; 366/189; 366/268; 366/269; 422/133
[58] Field of Search ................ 366/96, 131, 136, 138, 366/159–162, 168, 172, 173, 177–179, 189, 267–269; 422/133, 224; 137/625.4, 625.48, 115, 606, 224, 563; 222/135, 217, 145, 318; 425/557, 558, 205

[56] References Cited

U.S. PATENT DOCUMENTS

| 4,070,008 | 1/1978 | Schlieckmann | 366/189 X |
| 4,115,299 | 9/1978 | Muhle | 422/133 X |
| 4,418,041 | 11/1983 | Johnson et al. | 422/133 |
| 4,440,500 | 4/1984 | Schneider | 366/177 |

FOREIGN PATENT DOCUMENTS 2065841 5/1970 Fed. Rep. of Germany .
2413337 9/1975 Fed. Rep. of Germany .

Primary Examiner—Timothy F. Simone
Attorney, Agent, or Firm—Keil & Weinkauf

[57] ABSTRACT

A mixing head essentially comprises a housing with a mixing chamber which has inlet orifices for the individual plastics components and an outlet orifice for the plastics component mixture. In the mixing chamber is located an expulsion plunger of identical cross-section, which plunger is connected to a working piston which can be actuated by a pressure medium, the plunger being movable to and fro between a mixing position, which leaves the inlet orifices open, and a position in the region of the front outlet orifice, in which it seals the inlet orifices from the mixing chamber. The mixing head moreover has a restrictor which can be pushed into and out of the mixing chamber by a pressure medium. In the direction of motion of the expulsion plunger for reaching the mixing position B, the working piston displaces, starting shortly before one extreme position and ending upon reaching this extreme position, a pressure medium from the pressure chamber in front of its control surface facing away from the expulsion plunger, whereby the piston allocated to the restrictor can be moved so as to push the restrictor into the mixing chamber. For moving the expulsion plunger into the expulsion position, the working piston can be subjected to pressure medium via two connections, of which one connection can be sealed shortly after the working piston leaves its extreme position and at the same time the restrictor can be pushed out of the mixing chamber, while thereafter the other connection can be subjected to pressure medium.

5 Claims, 3 Drawing Figures

MIXING HEAD FOR PRODUCING A PREFERABLY CHEMICALLY REACTIVE MIXTURE OF TWO OR MORE PLASTICS COMPONENTS

The invention relates to a mixing head for producing a preferably chemically reactive mixture of two or more plastics components, comprising a mixing chamber which has inlet orifices for the individual plastics components and an outlet orifice for the plastics component mixture, an expulsion plunger located in the mixing chamber and having the same cross-section, the plunger being connected with a working piston which can be actuated by a pressure medium, and being movable to and fro between a mixing position which leaves the inlet orifices open, and a position in the region of the front outlet orifice, in which it seals the inlet orifices from the mixing chamber, as well as a restrictor which can be moved into and out of the mixing chamber by a pressure medium.

In a known mixing head of this type (German Published Application DAS No. 2,065,841) the inlet orifices for the individual plastics components open and close alternately and simultaneously without it being necessary to provide special control means for the opening and closing, since during the to-and-fro motion of the expulsion plunger the latter always travels over the inlet orifices. At the same time as the mixture is expelled, the mixing chamber wall is freed of mixture residues, these being removed by the expulsion plunger, having the same crosssection as the mixing chamber, as the plunger moves outward. To produce a mixture input pressure in the mixing chamber, this pressure being important in assuring homogeneity of the mixture and pore formation in foamed moldings, a restrictor can be hydraulically moved into and out of the mixing chamber between the inlet orifices and the outlet orifice. Since the expulsion plunger can collide with the restrictor, care must be taken to ensure that this does not happen.

Various attempts have already been made to overcome the problem of unintended collision of the expulsion plunger with the restrictor. For example, according to German Laid-Open Application DOS No. 2,413,337 the control of the hydraulic drive unit for the expulsion plunger is used to control a separate hydraulic drive unit for the restrictor. However, at the end of the injection sequence a change in the mixing conditions occurs since the restrictor must first move back into its starting position and only then are the injection orifices closed.

To prevent a collision of the restrictor with the expulsion plunger located in the mixing chamber it has also already been proposed to connect the pressure medium circuit for the motion of the expulsion plunger with the pressure medium circuit for the motion of the restrictor and to employ the motion of the expulsion plunger as a control pulse for the motion of the restrictor, and vice versa. It is true that such a mixing head ensures very accurate metering of the plastics components and thorough mixing, but it demands a comparatively greater technical effort. For various applications, this effort appears unjustified, especially if the primary object is that the mixture should be expelled as a calmed stream, while the degree of mixing does not require further improvement by additional measures.

It is an object of the invention to provide a mixing head having simple and reliable control of the restrictor as a function of the motion of the expulsion plunger.

We have found that this object is achieved by the measures proposed in the characterizing clause of claim 1.

Hence, according to the invention, it is first the expulsion plunger which moves at the start of the injection sequence. When a particular mechanically defined position of the expulsion plunger, in which position the path of the restrictor is free, has been reached, the restrictor is pushed into the mixing chamber while at the same time the expulsion plunger continues its motion. The restrictor reaches its extreme position in the mixing chamber before the expulsion plunger frees the inlet orifices for the plastics components. In other words, the actual injection sequence only starts when the restrictor has already been completely inserted into the mixing chamber, so that the stream of mixture is calmed also during the initial phase of the injection sequence. Similar remarks apply to the final phase of the injection sequence, since here the expulsion plunger is first moved out of its mixing position to such an extent that the inlet orifices are sealed from the mixing chamber and recirculation of the plastics components is possible. The expulsion plunger is stopped in a further accurately defined position and the restrictor is pushed out of the mixing chamber. The remaining stroke of the expulsion plunger takes place immediately thereafter. The expulsion plunger does not have to maintain its intermediate position accurately. It is merely necessary that the inlet orifices should be sealed from the mixing chamber and that at the same time the expulsion plunger does not as yet touch the restrictor.

The mixing head according to the invention is distinguished by having absolutely reliable sequential control so that there is no danger of its self-destruction. The electrical limit switches conventionally used, which in particular are a major possible cause of damage in rough manual operation and moreover restrict the mobility of the mixing head, can be dispensed with. The control of the expulsion plunger and of the restrictor is hydraulic/mechanical; the corresponding components would not be expected to exhibit wear; they can moreover be very compactly integrated on the mixing head, so that the size and weight of the latter remain small.

Further advantageous embodiments of the mixing head according to the invention form the subject of subclaims 2 to 5.

Figure 2:
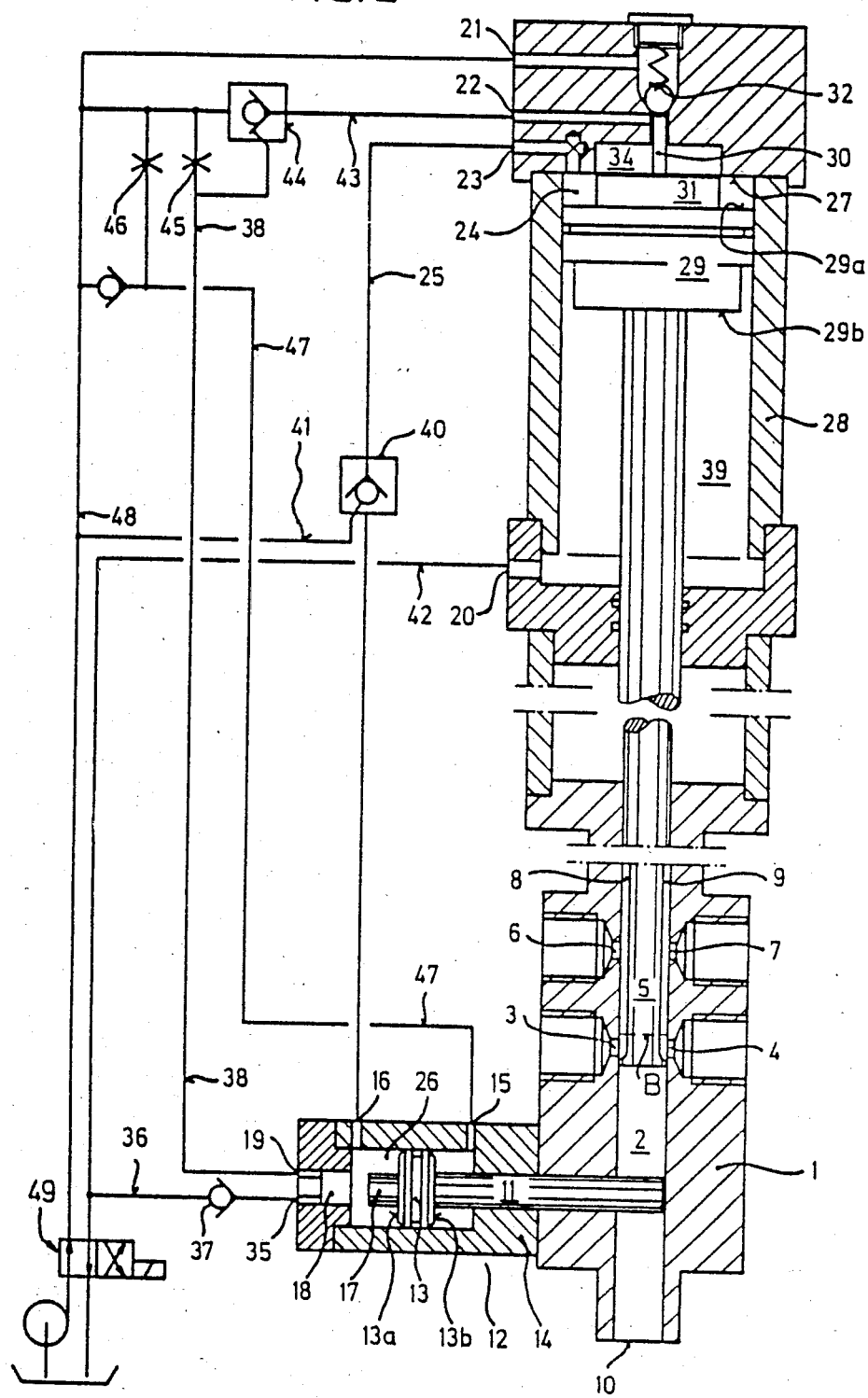
Figure 3:
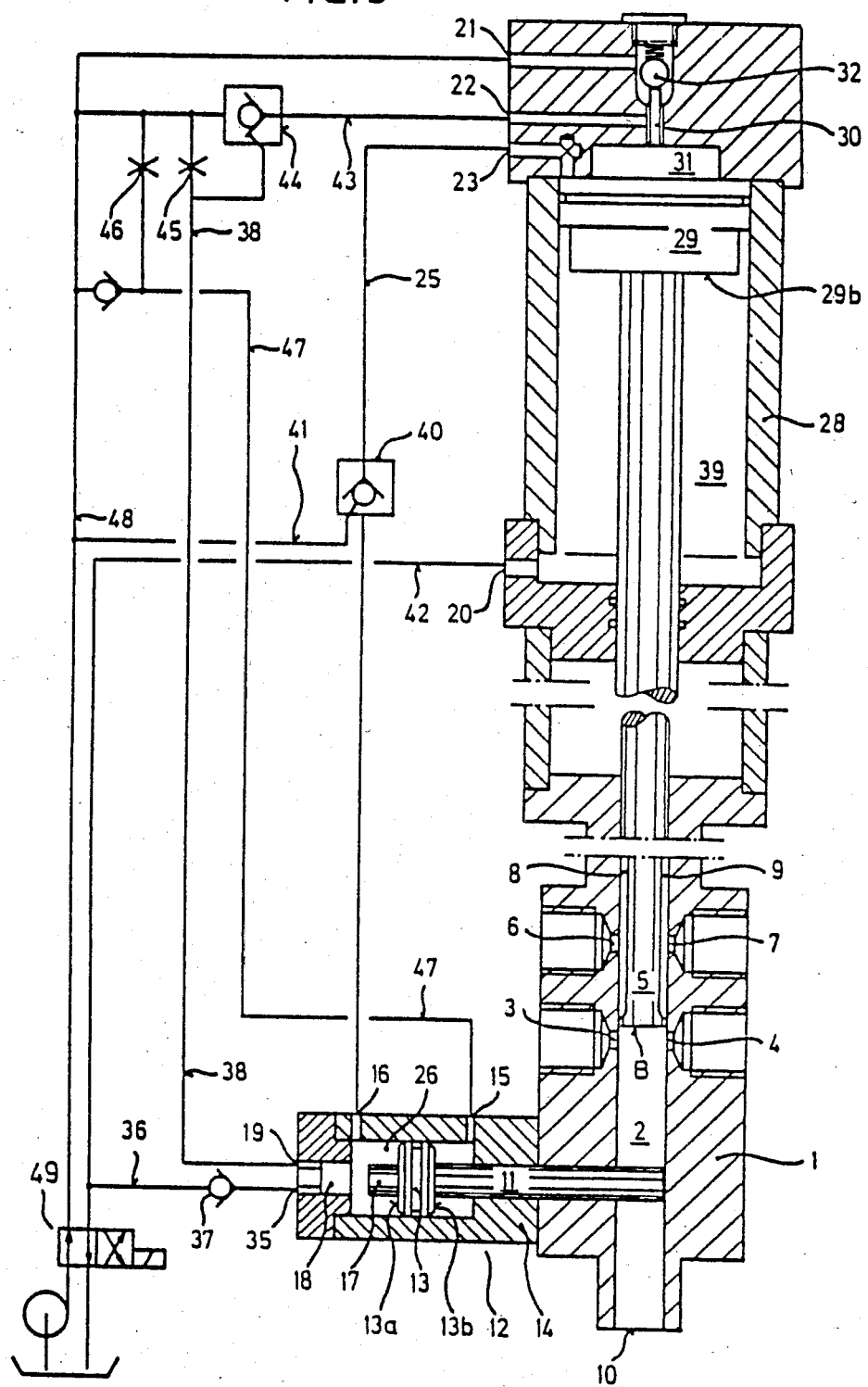

In the text which follows the invention is explained in more detail in terms of an illustrative embodiment, with reference to the drawings. In the drawings:

FIG. 1 shows the mixing head in longitudinal section, with a flow diagram, the expulsion plunger occupying the expulsion position A, FIG. 2 shows the mixing head depicted in FIG. 1, with the expulsion plunger in an intermediate position and FIG. 3 shows the mixing head, with the expulsion plunger in mixing position B.

Essentially the mixing head consists of a housing 1 in which is formed a broadly cylindrical mixing chamber 2. Inlet orifices 3 and 4 lead into the mixing chamber and inlet lines for the feed of the plastics components are connected directly or via nozzles to these orifices. 5 denotes an expulsion plunger which can be moved to and fro in the mixing chamber in order to control the feed of the plastics components and at the same time to clean the mixing chamber. In FIG. 1, the expulsion plunger is illustrated in its advanced position—the expulsion position A. In this position, the plastics components do not impinge on one another and instead are recycled to the reservoirs via recycle grooves 8 and 9 through orifices 6 and 7. The expulsion plunger assumes the mixing position when its lower end face reaches the broken line B, while the intermediate position corresponds to that shown in FIG. 2. At least one restrictor 11 can be pushed forward into the mixing chamber 2 between the inlet orifices 3 and 4 and the outlet orifice 10 for the mixture of plastics components.

The restrictor 11 preferably consists of one or more cylindrical pins and is controlled by a piston cylinder unit 12 which is fixed to the housing 1 of the mixing head. The piston 13 and cylinder 14 of this piston cylinder unit are constructed as a hydraulic adjustment member. The piston 13 is actuated by feeding a hydraulic pressure medium through the connections 15 and 16 to one or other side of the piston. On its free control surface 13a the piston 13 has a projection 17 which acts on a recess 18. In the end wall of the cylinder 14 opposite the restrictor 11 there are moreover provided in the recess 18 an orifice 19 to which a control line 38 is connected, as well as an orifice 35. In this way, unrestricted outflow of the pressure medium from the connection 16 to the orifice 35 is attainable.

The expulsion plunger 5 is actuated by feeding a pressure medium into the working cylinder 28, which contains a working piston 29 fixedly connected to the expulsion plunger. For feeding this pressure medium, the pressure medium connections 20, 21 and 22 are provided. Moreover, the working cylinder has a connection 23 which opens into the end face 27 and is connected, via the line 25, to the connection 16 of the piston cylinder unit 12. On its control surface 29a which faces away from the expulsion plunger 5, the working piston 29 has two projections 30 and 31, resembling trunk pistons, of which the projection 30 corresponds to a spring-loaded non-return valve 32 located at the end of a hole 33 in the end face 27, while the projection 31 cooperates with a recess 34 of matching shape and cross-section. The projections 30 and 31 and the recess 34 and hole 33 are preferably coaxial with one another. The connections 21 and 22 open into the non-return valve 32 and in the hole 33 respectively.

The feed of pressure medium via the connection 20 has the effect that the working piston 29 is moved into its upper extreme position. Shortly before this extreme position, an accurately defined intermediate position of the working piston is reached when the end face 31a of the projection 31 covers the recess 34, pressure medium at the same time being trapped in an annular space 24 between the control surface 29a and the end face 27. At the same time, the expulsion plunger 5 is also in an intermediate position in which, firstly, the path of movement for the restrictor 11 is freed and secondly the inlet orifices 3 and 4 are still sealed from the mixing chamber 2 and the plastics components can be recycled to the reservoirs. In this position, the restrictor can be inserted into the mixing chamber by appropriately subjecting the corresponding piston 13 to pressure medium. The control of the restrictor as a function of the position of the expulsion plunger takes place per force, in that the pressure medium circuit for the motion of the working piston is connected to the pressure medium circuit for the motion of the restrictor. As a result of the further motion of the working piston due to pressure medium being fed into the pressure chamber 39 in front of the control surface 29b, the pressure medium trapped in the annular space 24 is displaced out of the working cylinder and passes via the line 25 into the pressure chamber 26 which brings the piston 13 of the restrictor 11 into the restriction position. For this purpose, the volume of the annular space 24 must be such that the motion of the restrictor has ended before the inlet orifices 3 and 4 into the mixing chamber 2 are freed. At the end of this motion of the restrictor, an annular gap is made free between the projection 17 and the recess 18 in the cylinder 14. The pressure medium displaced from the annular space 24 flows, without adverse pressure built-up, through this annular gap, via the orifice 35 and the non-return valve 37 through the line 36 and enters the line 42 until the working piston 29 has reached it extreme position corresponding to the mixing position B of the expulsion plunger 5. For the function sequence described it is necessary to provide, in the line 25, a switchable valve 40 which can be switched after the intermediate positions of the working cylinder and expulsion plunger have been reached. For this purpose, the valve 40 is connected via a control line 41 to the pressure medium line 48. An example of a suitable switchable valve is a non-return valve which can be blocked by a hydraulic control pressure. This arrangement ensures that the restrictor is pushed into the mixing chamber before the expulsion plunger reaches the mixing position B.

In the mixing position B of the expulsion plunger 5, the spring-loaded non-return valve 32 is opened by the projection 30 of the working piston 29. To reach the expulsion position A, the pressure is released from the pressure medium connection 20 and the connections 21 and 22 are subjected to pressure medium. A switchable valve 44 is provided in the line 43 linked to the connection 22, so that to start with pressure medium can only pass into the working cylinder 28 via the connection 21 and moves the work ing piston or expulsion plunger from the mixing position B in the direction of the lower extreme position until the spring-loaded non-return valve 32 closes. The valve 44 is connected to the control line leading to the connection 19 of the piston cylinder unit 12, in which control line there is furthermore provided an orifice plate 45. A further orifice plate 46 is present in the line 47, which branches off the line 43 and ends at the connection 15 of the piston cylinder unit; the pressure medium flowing through this line moves the restrictor 11 out of the mixing chamber 2 until the restrictor reaches its extreme position and the projection 17 of the piston 13 seals the orifice 19 of the cylinder 14. In this position, the restrictor has been completely retracted from the mixing chamber and the path for the further stroke of the expulsion plunger 5 is freed. Upon closing of the orifice 19, the pressure in the control line 38 rises until the valve 44 is switched. This causes the connection 22 to be subjected to pressure medium via the line 43, and the working piston 29 to move into its lower extreme position.

Assuming that a mixing sequence is to be performed, i.e. that the expulsion plunger 5 is to be brought from position A into position B, a solenoid valve 49 is energized and the connection 20 is subjected to pressure medium via the line 42. The pressure medium line 48 and the lines branching off it are free from pressure. The pressure medium pump delivers pressure medium at a constant flow rate per unit time into the pressure chamber 39 in front of the control surface 29b of the working piston 29, thereby moving the working piston in the direction of its upper extreme position, until the end face 31a of the projection 31 covers the recess 34 and an annular space 24 filled with pressure medium forms. During the continued motion of the working piston pressure medium flows from the annular space 24 via the line 25 into the piston cylinder unit 12 and pushes the restrictor 11 into the mixing chamber 2. After the restrictor has been pushed into the mixing chamber the working piston reaches its upper extreme position and the expulsion plunger reaches the mixing position B.

To terminate the mixing process, the solenoid valve 49 is again actuated and pressure medium is fed via the line 48 to the connection 21. The connection 20 is relieved of pressure. This causes the working piston to move until the spring-loaded non-return valve 32 closes. At the same time, part-streams pass into the control line 41 and, via the orifice plates 45 and 46, into the control line 38 and the pressure medium line 47. The latter causes the piston 13 to move, pushing the restrictor 11 out of the mixing chamber 2. The part-stream in the control line 38 is passed into the pressure chamber 26 and enters, via the orifice 35, into the line 36 which contains a non-return valve 37 and leads to the pressure medium tank, until the plunger 13 of the restrictor rests against the end wall of the cylinder 14 and seals the orifice 19. Consequently, a higher pressure builds up in the control line 38 and the valve 44 is switched, so that pressure medium flows into the connection 22. The working piston 29 and expulsion plunger are thereby pushed into the respective lower extreme position, i.e. the expulsion position A for the expulsion plunger.

I claim:

1. A mixing head for producing a preferably chemically reactive mixture of two or more plastic components, comprising a mixing chamber which has inlet orifices for the individual plastic components and an outlet orifice for the plastic component mixture, an expulsion plunger located in the mixing chamber and having the same cross-section as the mixing chamber, the expulsion plunger being connected with a working piston which is guided in a working cylinder which has a pressure chamber and can be actuated by a pressure medium, and being movable to and fro between a mixing position which leaves the inlet orifices open, and an expulsion position in which it seals the inlet orifices from the mixing chamber, as well as a restrictor which can be moved into and out of the mixing chamber by a pressure medium, wherein the working piston, in the direction of motion of the expulsion plunger for reaching the mixing position, displaces, starting shortly before and ending upon reaching the mixing position, a pressure medium from the pressure chamber within the working cylinder which has a control surface which faces away from the expulsion plunger, whereby the piston which pushes the restrictor into the mixing chamber can be moved, and wherein for the motion of the expulsion plunger for reaching the expulsion position, the working piston can be subjected with a pressure medium via two connections, of which one connection can be sealed shortly after the working piston leaves its mixing position, and at the same time the restrictor can be pushed out of the mixing chamber, while thereafter the other connection can be subjected to a pressure medium.

2. The mixing head defined in claim 1, wherein the control surface of the working piston which faces away from the expulsion plunger has trunk piston-like projections, of which one projection corresponds to a spring-loaded non-return valve and the other projection cooperates with a recess, of matching shape and cross-section in the working cylinder end wall shortly before reaching, and upon reaching, the mixing position of the to-and-fro piston motion.

3. The mixing head as defined in claim 1, wherein the pressure medium circuit for the motion of the working piston and the pressure medium circuit for the motion of the restrictor each have a valve which can be switched as a function of a control pressure, one of the said valves being switched when the projection of the working piston reaches the recess in the working cylinder end wall and the other valve being switched after the piston of the restrictor leaves the restriction position.

4. The mixing head as defined in claim 3, wherein one valve is connected to a control line which is linked to the pressure medium line which leads to the connection for the motion of the expulsion plunger for reaching the expulsion position, the said pressure medium line leading into the pressure chamber which urges the piston of the restrictor into the restriction position, the orifice of this control line being sealable by the piston.

5. The mixing head as defined in claim 3, with one valve being connected to a control line which is linked to the pressure medium line leading to the connection for the motion of the expulsion plunger for reaching the expulsion position, which pressure medium line leads into the pressure chamber which urges the piston of the restrictor into the restriction position, the orifice of the said control line being sealable by the piston, wherein the piston has, on its control surface facing away from the restrictor, a trunk piston-like projection which corresponds to a recess in the end wall of the cylinder, the orifices for the control line and for a pressure medium line being located in this recess.

* * * * *